UNITED STATES PATENT OFFICE.

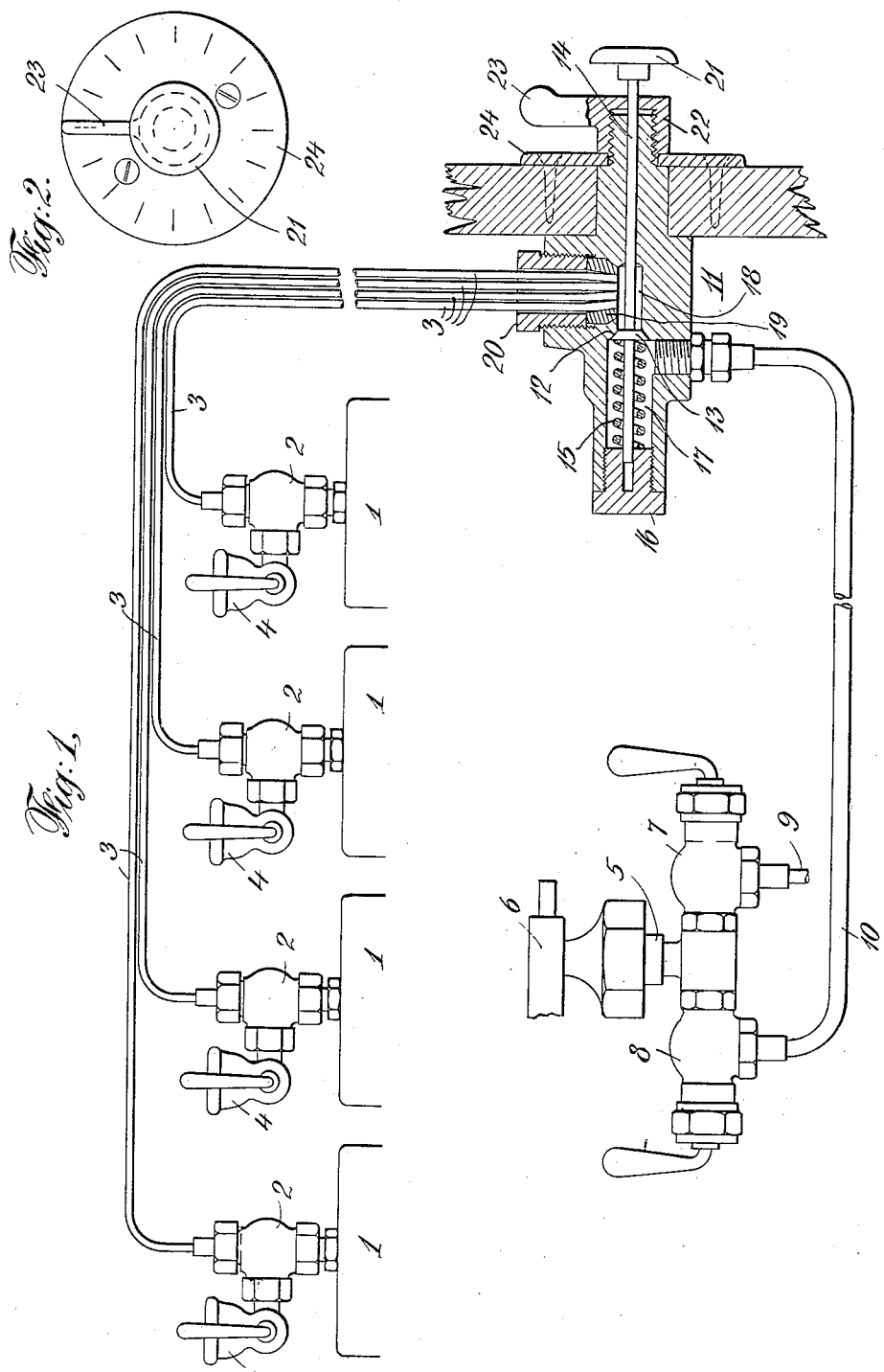

ANDREW C. THOMPSON, OF PLAINFIELD, NEW JERSEY.

STARTING DEVICE FOR INTERNAL-COMBUSTION ENGINES.

1,056,380. Specification of Letters Patent. Patented Mar. 18, 1913.

Application filed November 21, 1911. Serial No. 661,465.

*To all whom it may concern:*

Be it known that I, ANDREW C. THOMPSON, a citizen of the United States of America, and a resident of Plainfield, in the county of Union and State of New Jersey, have invented a certain new and useful Starting Device for Internal - Combustion Engines, of which the following is a specification.

My invention relates to improvements in starting devices for internal combustion engines and is particularly applicable to the engines of motor vehicles, motor boats, aeroplanes, etc., though also applicable to stationary and other types of internal combustion engines.

The starting device herein described is of that type which is arranged, upon the actuation of a suitable valve, to admit to the engine cylinders a combustible gas drawn from a pressure tank or other suitable source of supply; such gas being preferably one which forms an explosive mixture with air through a wider range than does gasolene vapor, and which may be ignited in the engine cylinder at a lower pressure than can a mixture of air and gasolene vapor. Acetylene is such a gas, and is the gas which I prefer to use in my starter; tanks of such gas being a common article of commerce.

The objects of my invention are to provide a simple and compact device of the type described, which may be applied easily to existing motor vehicles as well as to new vehicles, and which is relatively inexpensive; to insure equal charges of the gas to all cylinders of the engine; to provide for ready regulation of the pressure at which the gas is supplied to the engine; to so arrange the valve of the device that the pressure of the gas in the storage tank shall tend to keep the valve closed; and to so construct the device that it may be easily operated and may be operated correctly by persons of little mechanical skill.

I will now proceed to describe my invention with reference to the accompanying drawings and will then point out the novel features in claims.

In the drawings: Figure 1 shows more or less diagrammatically a longitudinal vertical section of the valve of my starting device, attached to the dash-board of a motor vehicle, in connection with the piping to connect such valve to the pressure tank and to the cylinders of an engine; and Fig. 2 is a face section of the operating device, dial plate and adjustable stop.

In said drawings, 1, 1 designate the cylinders of an internal combustion engine; and 2, 2 designate connecting plugs whereby small pipes 3, 3 may be connected to the engine cylinders; each cylinder having one such pipe connected thereto. As shown, the plugs 2 also comprise valved vents 4, 4 whereby by means of such valves the compression of the engine may be relieved, the action of each cylinder observed, and whereby the engine may be primed with gasolene if desired.

5 designates a pipe fitting adapted for connection to it of a pipe 6 leading from a gas storage tank, not shown, or other suitable source of supply, and 7 and 8 designate two valves, one of which may control the flow from pipe 6 of gas to a pipe 9 and thence to the lamps of the vehicle. The other valve, 8, controls the flow of gas from pipe 6 to a pipe 10 leading to the starting valve 11. This starting valve comprises a casing having within it a valve seat 12 and a valve plug 13; such valve plug being mounted upon a spindle 14 and being normally pressed toward its seat by a spring 15. The spindle 14 is mounted to slide in a suitable bearing in the casing of the valve, and also in the end plug 16 which closes one end of the valve casing. Within said valve casing, and in rear of the valve plug 13, a chamber 17 is provided; and on the other side of the valve plug a smaller chamber 18 is provided. This chamber 18 has in one side a port into which is fitted a plug 19 held in place by a gland screw 20; and into this plug are brazed or soldered the ends of pipes 3; the spelter or solder filling the spaces around the pipes 3 so that no gas can escape around such pipes. A handle or pedal 21 is provided for moving the valve spindle 14 axially so as to open the valve.

Most motor vehicle internal combustion engines, and many other internal combustion engines, are provided with ignition devices whereby a spark may be produced in one of the cylinders of the engine, when the engine is standing still, whereby the engine may sometimes be started upon a charge remaining in such cylinder from the previous operation of the engine. The starting device herein described is intended to be applied to such engines. In starting such an engine by means of my improved starting device, the operator pushes the handle 21 in for an instant and then lets go, thereby opening valve 13 for an instant only. This admits gas from the pipe 10 into the pipes 3 and thence into the cylinders of the engine. The operator then operates the ordinary ignition device of the engine to produce a spark in that cylinder which is in condition for an explosion; whereupon the gas so admitted through the pipe 3 of that cylinder and which has already mixed with the air of that cylinder, is ignited and an impulse is given to the piston of that cylinder.

It is important, in the case of starting devices which are arranged to admit an explosive gas to the engine cylinder, that all cylinders receive the same charge; otherwise it may happen that some of the cylinders may receive too much gas and others may receive too little. By my device, the same quantity of gas is supplied to each cylinder of the engine since these cylinders are connected in parallel to the starting valve and receive gas at the same instant and all by a single operation of said valve. Moreover, in practice, to further insure equal charges to the several cylinders, the pipes 3 are made of equal length; excess of piping as to those cylinders which are nearer the starting valve being taken up by simply coiling up such pipe.

It is further important that means be provided for compensating for varying pressure in the storage tank. Such tanks when freshly charged contain gas at a pressure of two hundred pounds per square inch and over; and before the tanks are considered empty, such pressure has fallen to from forty five to thirty pounds per square inch. To this end I provide on one end of the valve casing, a stop 22 for the handle 21, said stop being screw threaded upon the end of the valve casing; and beneath the projecting handle 23 of this stop I provide a dial plate 24 graduated to correspond with the graduations of the pressure gage of the storage tank. By setting this handle 23 to different positions the extent of opening of valve 13 may be varied, and thereby the pressure at which the gas is supplied to the pipes 3 may be varied. The thread of the screw of the stop 22 is such that the various positions of said stop, with reference to the graduations of the dial plate 24, correspond to the various pressures as shown by the gage of the pressure tank, valve 13 being permitted to open only very slightly, therefore, when the pressure in the tank is high, and being permitted to open more widely, when the pressure in the tank is low; the handle 23 being of course set, from time to time, to correspond with the pressure in the tank as shown by the gage of such tank.

What I claim is:—

1. An internal combustion engine starting device such as described, comprising a valve casing having within it a valve seat and chambers on opposite sides of said seat, and provided with a valve adapted to seat on such valve seat, and means for opening and closing said valve, the chamber of such valve casing which is on the supply side of the valve being adapted for connection to a source of gas supply, the chamber of said valve casing which is on the discharge side of the said valve having connected to it in parallel a plurality of conduits adapted to be connected to the cylinders of an engine.

2. An internal combustion engine starting device such as described, comprising a valve adapted to connect a source of gas supply with one or more conduits leading to the cylinders of an engine, said valve comprising a single actuating device adapted to be operated by longitudinal motion thereof, and further comprising an adjustable stop regulating the extent of opening of the valve, whereby the pressure at which gas is supplied to the engine may be regulated.

3. An internal combustion engine starting device such as described, comprising a valve casing provided with a valve seat and with an admission chamber on one side of said seat, a valve in said casing mounted to seat on said valve seat and arranged to be held closed normally by the pressure in the admission chamber, said admission chamber having an inlet connection and said discharge chamber having a discharge connection, a source of gas supply connected to said inlet connection, and a plurality of gas conduits connected in parallel to the outlet connection.

4. An internal combustion engine starting device such as described, comprising a valve casing provided with a valve seat and with an admission chamber on one side of said seat, a valve in said casing mounted to seat on said valve seat and arranged to be held closed normally by the pressure in the admission chamber, said admission chamber having an inlet connection and said discharge chamber having a discharge connection, a source of gas supply connected to said inlet connection, a plurality of gas conduits connected in parallel to the outlet connection, and a spring tending to hold said valve seated.

5. An internal combustion engine starting device such as described, comprising a valve casing provided with a valve seat and with an admission chamber on one side of said seat, a valve in said casing mounted to seat on said valve seat and arranged to be held closed normally by the pressure in the admission chamber, said admission chamber having an inlet connection and said discharge chamber having a discharge connection, a source of gas supply connected to said inlet connection, a plurality of gas conduits connected in parallel to the outlet connection, a spring tending to hold said valve seated, and an adjustable stop regulating the extent of opening of the valve.

6. An internal combustion engine starting device such as described, comprising a valve casing having an admission chamber and a discharge chamber, said admission chamber having an inlet port and said discharge chamber having an outlet port, a valve controlling the flow of gas from the admission chamber to the discharge chamber, and a plurality of conduits leading into and terminating in said outlet port and brazed into said outlet port.

7. An internal combustion engine starting device such as described, comprising a valve adapted to connect a source of gas supply with one or more conduits leading to the cylinders of an engine, said valve comprising operating means, a dial indicating various degrees of openings of the valve, and a stop for said valve-operating means movable over the dial and arranged to regulate the extent of opening of the valve according to the position of such stop with reference to the dial.

8. An internal combustion engine starting device such as described, comprising a valve adapted to connect a source of gas supply with one or more conduits leading to the cylinders of an engine, said valve comprising a valve stem adapted to be moved longitudinally, and thereby to open or close the valve, said valve stem provided with a head, and a screw stop beneath the head of said valve stem and adapted to be moved toward and from said head by rotation, said stop regulating the extent of opening of the valve.

In testimony whereof I have signed this specification in the presence of two subscribing witnesses.

ANDREW C. THOMPSON.

Witnesses:
  H. M. MARBLE,
  D. A. DAVIES.